July 1, 1947.  J. McC. BRUMBAUGH  2,423,368
VOLTAGE REGULATOR
Filed Sept. 22, 1943
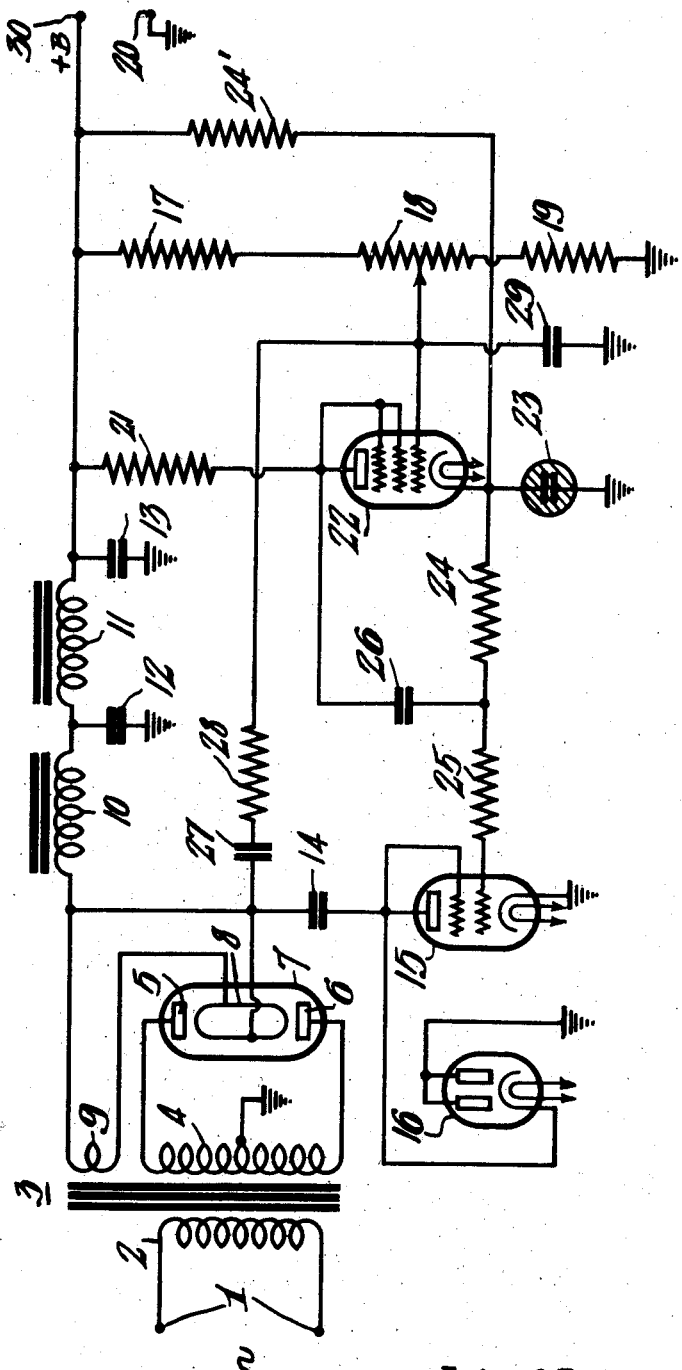
Inventor
John McC. Brumbaugh
By
Attorney Patented July 1, 1947

2,423,368

UNITED STATES PATENT OFFICE 2,423,368

VOLTAGE REGULATOR

John McCall Brumbaugh, Lansdowne, Pa., assignor to Radio Corporation of America, a corporation of Delaware Application September 22, 1943, Serial No. 503,588

6 Claims. (Cl. 171—119)

The instant invention relates generally to voltage regulating devices and more particularly to a D.-C. voltage regulator circuit for a source of filtered direct voltage wherein variations in the output voltage derived from the filter are stabilized by varying the reactance presented by the filter to the voltage source.

Heretofore, various circuits have been employed for reducing voltage fluctuations resulting from power line voltage surges and load variations encountered in power circuits for supplying operating voltages to thermionic tube apparatus. One of the disadvantages of known systems of voltage regulating is that considerable voltage drop is inherent in the voltage regulating circuit, thereby necessitating appreciably higher source voltage than is required for the load circuit. This disadvantage is especially true in the types of voltage regulation wherein compensating shunt or series regulating circuits are connected intermediate the voltage source and the load circuit.

The instant invention contemplates a simple regulating circuit responsive to the voltage output of a smoothing filter which is connected intermediate the source of unregulated voltage and the load circuit. A relatively high impedance voltage divider selects a portion of the output voltage derived from the filter and applies this voltage to a thermionic tube circuit which increases the anode-cathode impedance of a thermionic tube in accordance with increases in the output voltage derived from the filter. The anode-cathode circuit of this tube is connected in series with a capacitor, and the capacitor and tube are connected across the input of the smoothing filter network. The resulting effect is to decrease the capacitive reactance, and increase the inductive reactance, presented by the filter to the unregulated power source, which results in appreciably stabilizing the output voltage derived from the filter network.

The invention will be described herein with reference to its application to a conventional full-wave thermionic tube rectifier circuit which includes a conventional two stage low-pass filter network. It should be understood, however, that the invention may be applied to other types of filtered power supply circuits.

Among the objects of the invention are to provide an improved voltage regulating circuit for a source of direct voltage. Another object of the invention is to provide an improved method of and means for providing voltage regulation of a source of direct voltage wherein a smoothing filter network is interposed between the voltage source and a load circuit. Another object of the invention is to provide an improved method of and means for regulating the output voltage derived from a direct voltage source wherein a control voltage is derived from a relatively high impedance circuit, and said voltage is applied to vary the impedance of a thermionic tube which is connected in series with capacitive reactance and wherein both tube and capacitive reactance are connected across the input of a filter network interposed between the voltage source and a load device. A further object of the invention is to provide an improved method of and means for regulating a source of direct voltage which includes a smoothing filter network interposed between the voltage source and a load circuit, wherein the output voltage derived from the filter network varies the ratio of capacitive to inductive reactance presented by the filter network to the voltage source. An additional object of the invention is to provide an improved voltage regulator of the type described which includes degenerative feedback means to prevent circuit oscillation.

The invention will be further described by reference to the accompanying drawing of which the single figure is a schematic circuit diagram of a typical embodiment thereof.

Referring to the drawing, a source of alternating potential is applied to the input terminals 1 which are connected to the primary winding 2 of a conventional voltage step-up transformer 3. The ends of a high voltage secondary winding 4 of the transformer 3 are connected to the two anode electrodes 5, 6, respectively, of a full wave rectifier tube 7. The center terminal of the high voltage secondary winding 4 of the transformer 3 is connected to ground. The cathode 8 of the full wave rectifier tube 7 is energized by a low voltage secondary winding 9 of the transformer 3 and is connected to one terminal of a first inductive reactor 10. The remaining terminal of the first inductive reactor 13 is connected to one terminal of a second inductive reactor 11 and to one terminal of a first filter capacitor 12. The remaining terminal of the second inductive reactor 11 is connected to one of the positive output terminals 30 and to one terminal of a second filter capacitor 13. The remaining terminals of the first and second filter capacitors 12, 13, respectively, are connected to ground.

One terminal of a third filter capacitor 14, which may have a value of the order of .5 microfarad, is connected to the cathode terminal of the full wave rectifier tube 7. The remaining terminal of the third filter capacitor 14 is connected to the anode of a first control thermionic tube 15 and to the cathode of a diode rectifier tube 16. The anode of the diode rectifier tube 16 is connected to ground. The cathode of the control thermionic tube 15 also is connected to ground.

A voltage divider, comprising a plurality of serially connected high resistors 17, 18, 19, is connected from the positive output terminal 30 to the remaining grounded output terminal 20. One terminal of an anode coupling resistor 21 is connected to the positive output terminal 30. The remaining terminal of the anode coupling resistor 21 is connected to the anode and screen electrodes of a second control thermionic tube 22. The control electrode of the second thermionic tube 22 is connected to an adjustable terminal on the high resistor 18. The cathode electrode of the second thermionic tube 22 is connected through a gaseous regulator tube 23, which may be of the RCA type VR-150, to ground. The cathode of the second control tube 22 is also connected through bleeder resistors 24, 24' to the positive output terminal 30, and is further connected through a pair of serially connected resistors 24, 25, to the control electrode of the first control thermionic tube 15. A first by-pass capacitor 26 is connected between the anode of the second control thermionic tube 22 and the common terminals of the serially connected resistors 24 and 25.

A degenerative feedback circuit, comprising a coupling capacitor 27 and a high resistor 28, is serially connected between the cathode of the full wave rectifier tube 7 and the control electrode of the second control thermionic tube 22. In addition a second by-pass capacitor 29 is connected between the control electrode of the second control tube and ground, to reduce the tendency of the control circuit to oscillate during the non-conducting intervals of the full-wave rectifier tube.

In operation, the voltage control circuit provides extremely low current drain on the output of the filter network. An increase in the output voltage provides an increase in the voltage derived from the adjustable terminal of the high resistor 18, which decreases the negative bias on the control electrode of the second thermionic control tube 22. The cathode of the second control tube 22 is maintained at a substantially fixed voltage with respect to ground by means of the gaseous regulator tube 22. Therefore, an increase in the output voltage derived from the filter network will increase the anode current of the second control tube 22 and decrease the voltage applied to the control electrode of the first thermionic control tube 15, thereby increasing the anode-to-cathode resistance of the first control tube. Since the first control tube 15 and the serially-connected third filter capacitor 14 are connected across the input of the filter network, an increase in the internal resistance of the first control tube will effectively reduce the capacitive reactance presented by the filter network to the rectified input voltage source. The effect of reducing the input capacitive reactance of the filter network will be to decrease the output voltage applied to the output terminals 30, 20. The diode rectifier 16 provides a discharge path to ground for the third filter capacitor 14, in order that the capacitor may discharge into the load circuit.

Since the system inherently is regenerative, the second by-pass capacitor 29 and the feedback circuit comprising the serially-connected capacitor 27 and high resistor 28 are included to prevent oscillation during the half cycle rectified peaks of the rectified power source.

In a typical circuit providing satisfactory voltage regulation and RCA type 6L6 tube was selected for the first control tube, and RCA type 6AC7 was selected for the second control tube, and a type 6X5 having its anode electrodes connected together was selected for the diode rectifier. The values of the resistors, capacitors and inductive reactors employed throughout the circuit will be determined by the frequency of the applied voltage source, the permissible voltage ripple at the output terminals, and the particular thermionic tubes employed in the voltage regulator circuit.

Thus the invention described comprises an improved voltage regulator circuit for a source of unregulated direct voltage wherein extremely low current drain is required for the regulator circuit and wherein variations in output voltage provide compensating variations in the ratio of capacitive-to-inductive reactance of the network connected to the unregulated power source.

I claim as my invention:

1. A voltage regulator comprising a source of voltage, a smoothing filter network connected to said source, means for deriving a control voltage from the output voltage derived from said network, and means including a capacitor and a thermionic tube serially connected across said filter network and responsive to said control voltage for varying the input shunt impedance presented by said filter network to said source.

2. A voltage regulator comprising a source of voltage, a smoothing filter network connected to said source, means including a voltage divider for deriving a control voltage from the output voltage derived from said network, and means including a capacitor and a thermionic discharge tube serially connected across said filter network and responsive to said control voltage for varying the input shunt impedance presented by said filter network to said source.

3. A voltage regulator comprising a source of voltage, a smoothing filter network connected to said source, means including a voltage divider and a thermionic discharge tube connected to said voltage divider for deriving a control voltage from the output voltage derived from said network, and means including a capacitor and a second thermionic tube serially connected across said filter network responsive to said control voltage for varying the input impedance presented by said filter network to said source.

4. Apparatus of the type described in claim 3 including a degenerative feedback circuit interposed between said thermionic discharge tubes for stabilizing said control voltage.

5. Apparatus for the type described in claim 3 including a rectifier providing a discharge path for said capacitor.

6. A voltage regulator comprising a source of voltage, a smoothing filter network connected to said source, means including a voltage divider and a thermionic discharge tube connected to said voltage divider for deriving a control voltage from the output voltage derived from said network, and means including a capacitor and a second thermionic tube serially connected across said filter network responsive to said control voltage for varying the reactance presented by said filter network to said source.

JOHN McCALL BRUMBAUGH.

REFERENCES CITED

The following references are of record in the file of this patent:

UNITED STATES PATENTS

| Number | Name | Date |
|---|---|---|
| 1,979,035 | Hammond | Oct. 30, 1934 |
| 2,309,852 | Lewis | Feb. 2, 1943 |